US009646297B2

(12) United States Patent
Van Den Broeck et al.

(10) Patent No.: US 9,646,297 B2
(45) Date of Patent: May 9, 2017

(54) METHOD AND SYSTEM OF PROVIDING FINANCIAL TRANSACTION CARD RELATED MOBILE APPS

(71) Applicant: MasterCard International Incorporated, Purchase, NY (US)

(72) Inventors: Rigo Van Den Broeck, Grimbergen (BE); Alan Cooke, Dublin (IE); Stephen Toner, Dublin (IE); Andrey Shishlo, Moscow (RU); Edward Kilbaine, Greystones (IE); Golnaz Amininejad, Brussels (BE); Benoit Maloir, Fexhe-Slins (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 365 days.

(21) Appl. No.: 14/138,973

(22) Filed: Dec. 23, 2013

(65) Prior Publication Data

US 2015/0178713 A1    Jun. 25, 2015

(51) Int. Cl.
*G06F 17/22* (2006.01)
*G06Q 20/32* (2012.01)
*G06Q 20/02* (2012.01)
*G06Q 20/22* (2012.01)

(52) U.S. Cl.
CPC ....... *G06Q 20/3221* (2013.01); *G06Q 20/027* (2013.01); *G06Q 20/227* (2013.01); *G06Q 20/3223* (2013.01)

(58) Field of Classification Search
CPC ............. G06Q 20/3221; G06Q 20/227; G06Q 20/027; G06Q 20/3223; G06Q 40/06
See application file for complete search history.

(56) References Cited

U.S. PATENT DOCUMENTS

| 6,128,603 A * | 10/2000 | Dent ..................... G06Q 20/04 705/33 |
| 7,988,058 B2 * | 8/2011 | Englebardt .......... G06K 19/077 235/451 |
| 8,489,497 B1 * | 7/2013 | Novak ................. G06Q 40/025 705/38 |
| 8,606,714 B1 * | 12/2013 | Cameo .................. G06Q 20/10 705/35 |

(Continued)

*Primary Examiner* — Maikhanh Nguyen (74) *Attorney, Agent, or Firm* — Buchanan Ingersoll & Rooney PC (57) ABSTRACT

An application providing method including: storing, at a memory of a cloud-based computing resource, at least two web-based applications; allowing a computing device of a user, after the user has gained access to a website of a financial institution of which the user has an account, to access the application offering page identifying the at least two web-based applications that are stored on the cloud-based computing resource; receiving, in the cloud-based computing resource, a selection of an application from the application offering page; transmitting, from the cloud-based computing resource to the computing device, data that allows the selected application to be displayed on the computing device, the selected application being stored on the cloud-based computing resource; and transmitting, from the cloud-based computing resource to the computing device, data that allows data pertaining to the user that was previously stored by the financial institution to be displayed on the computing device.

32 Claims, 7 Drawing Sheets

(56) References Cited

U.S. PATENT DOCUMENTS

| | | | | |
|---|---|---|---|---|
| 8,781,896 B2* | 7/2014 | LeBlanc | G06Q 30/02 | 705/14.41 |
| 8,793,184 B2* | 7/2014 | Lakshminarayanan | G06Q 20/02 | 235/379 |
| 9,116,763 B2* | 8/2015 | Kumar | G06F 9/547 | |
| 9,384,499 B2* | 7/2016 | Lyons | G06Q 30/0224 | |
| 2009/0090783 A1* | 4/2009 | Killian | G06Q 20/0855 | 235/492 |
| 2009/0327135 A1* | 12/2009 | Nguyen | G06Q 40/02 | 705/44 |
| 2012/0130790 A1* | 5/2012 | Lyons | G06Q 30/0224 | 705/14.25 |
| 2012/0130889 A1* | 5/2012 | Lyons | G06Q 20/3272 | 705/39 |
| 2012/0131094 A1* | 5/2012 | Lyons | G06Q 30/0224 | 709/203 |
| 2012/0185911 A1* | 7/2012 | Polite | G06F 21/6218 | 726/1 |
| 2013/0031028 A1* | 1/2013 | Martin | G06Q 30/08 | 705/400 |
| 2013/0060657 A1* | 3/2013 | Kudva | G06Q 20/12 | 705/26.8 |
| 2013/0066749 A1* | 3/2013 | Cooke | G06F 3/017 | 705/27.2 |
| 2013/0144862 A1* | 6/2013 | Ruhl | G06F 17/30873 | 707/710 |
| 2014/0129303 A1* | 5/2014 | Aiglstorfer | G06Q 40/00 | 705/14.4 |
| 2014/0279115 A1* | 9/2014 | Verma | G06Q 20/322 | 705/21 |

* cited by examiner

METHOD AND SYSTEM OF PROVIDING FINANCIAL TRANSACTION CARD RELATED MOBILE APPS

BACKGROUND

Field

The present disclosure relates to a system and method of making financial transaction card related mobile applications that are stored on a cloud-based computing device accessible to a user's computing device.

Brief Description of the Related Art

There presently exists an application store in which users can access a variety of applications, and then download the applications on their mobile device. However, there does not appear to be any existing appropriate level of services in the market that fully enable a user to access trusted financial transaction card related mobile applications that are stored on a cloud-based computing device.

SUMMARY

The present disclosure provides a system and method for providing financial transaction card related mobile applications that are stored on a cloud-based computing device to a user's device. In some embodiments, as the user can access the mobile applications on the cloud-based computing device, downloading the complete applications to a user's device is not always required, but rather, a user interface (UI) and communication protocol module can be downloaded so that significant processing can take place on potentially more powerful and/or potentially more secure computing devices in the cloud. The speed at which the applications can be maintained, updated and accessed can be increased in these embodiments. Further, the thinner UI and communications protocol applications will generally not occupy as much limited storage space on the user's device as would occur if more data processing occurs on the mobile device. In addition, because a portion of the functionality of applications is hosted at least in part on the cloud-based computing device, they can be easily accessible without regard to the format/device/operating system used by the user.

Also, because the application service may be operated by the issuer of a payment card of a user, account/card information can be used securely (e.g., through private or otherwise secure networks) without the need for this information to be stored or reside on the user's device or input by the user or be transferred across a network where it might be vulnerable. This allows for services and utilities to be offered to consumers by an issuer where they were not available before, and also allows for additional security and convenience to consumers who feel safer dealing with entities they trust with their information (e.g., their card issuer) rather than third party application developers, depending on the specific implementation.

The present disclosure is directed to an application providing method including: storing, at a cloud-based memory device of a cloud-based computing resource, at least two web-based applications that can be customized; allowing a computing device of a user, after the user has gained access to an online website of a financial institution of which the user has an account or a payment card and selected a link to an application offering page, to access the application offering page identifying the at least two web-based applications that are stored on the cloud-based computing resource; receiving, in the cloud-based computing resource, a selection of an application from among the at least two applications of the application offering page, the selection is made by the user via an interface device of the computing device; transmitting, from the cloud-based computing resource to the computing device, data that allows the selected application to be displayed on a display screen of the computing device, the selected application being stored on the cloud-based memory device of the cloud-based computing resource; and transmitting, from the cloud-based computing resource to the computing device, data that allows data pertaining to the user that was previously stored by the financial institution of the user to be displayed on a display screen of the computing device.

An application providing system, including: a computing device of a user that includes a processor, an interface device, and a display screen. The system also includes a financial institution that has an online website of which the user has an account or a payment card; and a cloud-based computing resource. The cloud-based computing resource is configured to store at a cloud-based memory device of the cloud-based computing resource at least two web-based applications that can be customized. The cloud-based computing resource is also configured to allow the computing device of the user, after the user has gained access to the online website of the financial institution and selected a link to an application offering page, to access the application offering page identifying the at least two web-based applications that are stored on the cloud-based computing resource. Further, the cloud-based computing resource is configured to receive, a selection of an application from among the at least two applications of the application offering page, the selection is made by the user via the interface device of the computing device. The cloud-based computing resource is configured to transmit, to the computing device, data that allows the selected application to be displayed on the display screen of the computing device, the selected application being stored on the cloud-based memory device of the cloud-based computing resource. Lastly, the cloud-based computing resource is configured to transmit, to the computing device, data that allows data pertaining to the user that was previously stored by the financial institution of the user to be displayed on a display screen of the computing device.

An application providing method including: storing, at a cloud-based memory device of a cloud-based computing resource, a plurality of web-based applications that can be customized; receiving, at the cloud-based computing resource, a selection from a financial institution of a set of web-based applications, from the plurality of web-based applications, that the financial institution will make available to a user that has an account or a payment card with the financial institution; receiving, at the cloud-based computing resource, instructions from the financial institution for customizing the set of web-based applications based on specifications of the financial institution; customizing the set of web-based applications based on the received instructions; allowing a computing device of a user, after the user has gained access to an online website of the financial institution and selected a link to an application offering page, to access the application offering page identifying the set of customized web-based application that are stored on the cloud-based computing resource; receiving, in the cloud-based computing resource, a selection of an application from among the set of customized web-based applications of the application offering page, the selection is made by the user via an interface device of the computing device; transmitting, from the cloud-based computing resource to the computing device, data that allows the selected application to be displayed on a display screen of the computing device, the selected application being stored on the cloud-based memory device of the cloud-based computing resource; and transmitting, from the cloud-based computing resource to the computing device, data that allows data pertaining to the user that was previously stored by the financial institution of the user to be displayed on a display screen of the computing device.

These and other features and advantages of particular embodiments of the method and system of providing financial transaction card related mobile applications will now be described by way of exemplary embodiments to which they are not limited.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

This description provides exemplary embodiments only, and is not intended to limit the scope, applicability or configuration of the method and system of providing financial transaction card related mobile apps. Rather, the ensuing description of the embodiments will provide those skilled in the art with an enabling description for implementing embodiments of the system and method. Various changes may be made in the function and arrangement of elements without departing from the spirit and scope of the disclosure as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Payment Account—A financial account that may be used to fund a transaction, such as a checking account, savings account, credit account, loan account, virtual payment account, etc., or nearly any other source of funds A payment account may be associated with an entity, which may include a person, family, company, corporation, governmental entity, etc. In some instances, a payment account may be virtual, such as those accounts operated by PayPal®, etc.

Payment Card—The term "payment card" or "financial transaction card" is a card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Debit Network—A system or network used for the transfer of money via the use of a debit card. Debit networks may use a variety of different protocols and procedures in order to process the transfer of money for various types of debit transactions. Debit networks may charge processing fees or other types of fees for the processing of a debit transaction to a merchant or to the merchant's financial institution (known as the merchant acquirer) from which the debit transaction is routed. Examples of networks or systems configured to perform as debit networks include Maestro, ACCEL, Interlink, MAC, MoneyPass, Pulse, SHAZAM, STAR, etc.

Debit Card—A specific type of card or data associated with a payment account that may be provided to a merchant in order to fund a financial transaction via the associated payment account. A debit card may be a physical card that may be provided to a merchant, or may be data representing the associated payment account (e.g., as stored in a communication device, such as a smart phone or computer). For example, in some instances, data including a payment account number may be considered a debit card for the processing of a transaction funded by the associated payment account. A debit card may differ from other types of payment cards (e.g., a credit card) in networks that are used to process transactions involving the card and that, for debit card transactions, funds are immediately transferred from the corresponding payment account to fund the transaction.

Issuer—the term "issuer" can include, for example, a financial institution (i.e., bank) issuing a card, a merchant issuing a merchant specific card, a stand-in processor configured to act on-behalf of the card-issuer, or any other suitable institution configured to issue a financial card.

Cloud storage—the term "cloud storage" or "cloud-based memory device" is a model of networked enterprise storage where data is in virtualized pools of storage, which are generally hosted by third parties. Hosting companies operate large data centers, and people who require their data to be hosted buy or lease storage capacity from them. The data center operators, in the background, virtualize the resources according to the requirements of the customer and expose them as storage pools, which the customers can themselves use to store files or data objects. Physically, the resources may span across multiple servers. The safety of the files depends can be controlled upon the hosting websites. Cloud storage services may be accessed through a web service application programming interface (API), a cloud storage gateway or through a web-based user interface.

Description

The method and system for providing financial transaction card related mobile applications will now be described by reference to the accompanying drawings in which like elements are described with like figure numbers.

Exemplary System Architecture

Figure 1:
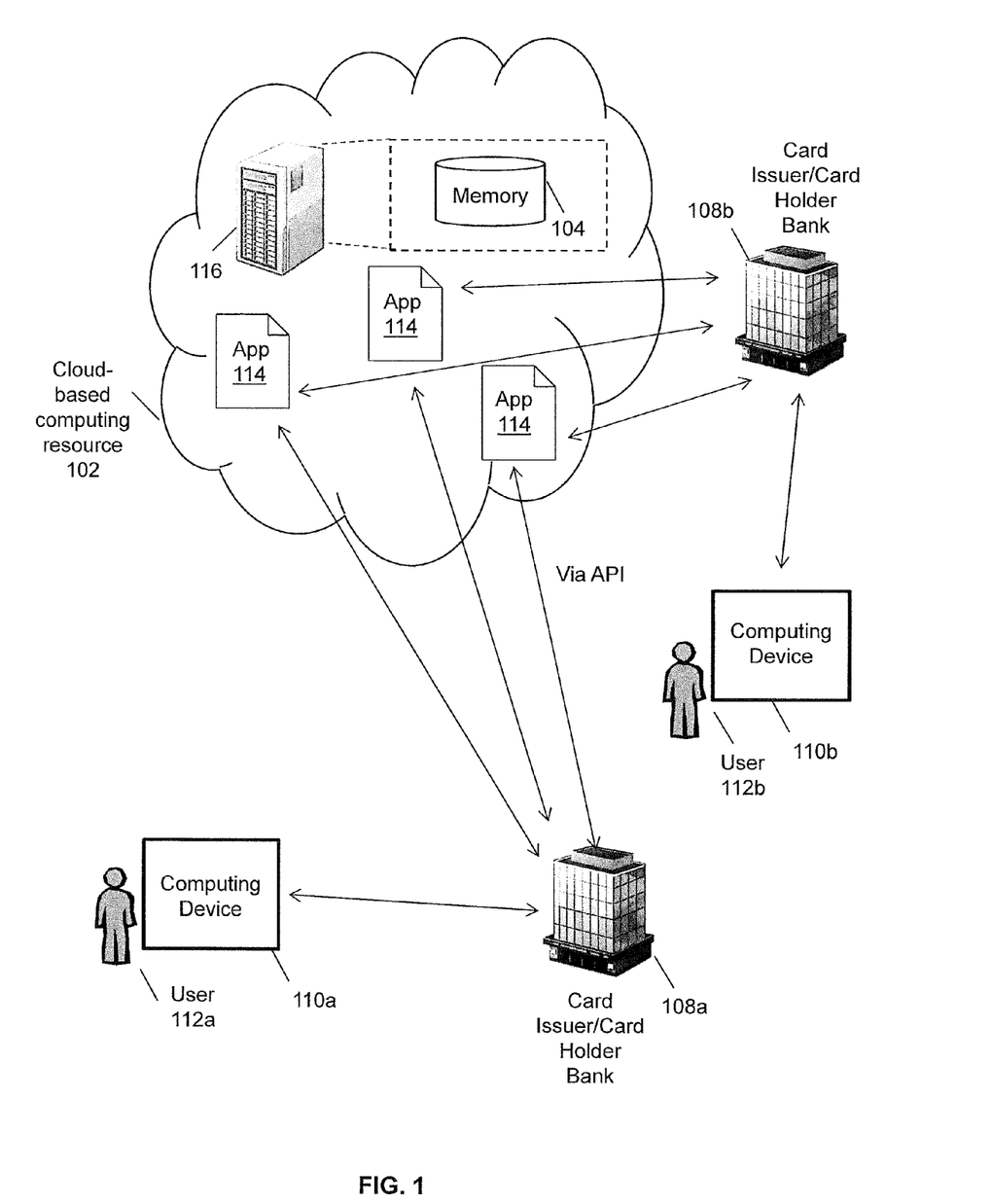
FIG. 1 illustrates a high level diagram of a system architecture that may be employed in accordance with an exemplary embodiment of providing financial transaction card related mobile applications.

FIG. 1 illustrates an application providing system that may include a computing device 110a of a user 112a and a computing device 110b of a user 112b that include at least a processor device, an interface device, and a display screen. The computing devices 110a and 110b can be, for example, a mobile phone, smartphone, tablet, laptop, desktop, etc., or other suitable computing device. The processor device of the computing device 110a, 110b as discussed herein may be a single processor, a plurality of processors, or combinations thereof. Processor devices may have one or more processor "cores." The processor device of the computing devices 110a and 110b can be, for example, the processor 604 which is contained in the computer 600 of FIG. 6, which will be discussed in detail later. An interface device of the computing device 110 can be, for example, a touch screen, keyboard, mouse, track ball, etc. Further, the display screen of the computing device 110a, 110b can be for example a CRT display, LCD display, LED display, DLP display, plasma display, etc.

The application providing system of FIG. 1 can also include financial institutions 108a and 108b. The financial institutions can be, for example, a card issuer/card holder bank or other financial institution that has an online website of which the user 112 has an account or a payment card with the financial institution 108. For example, user 112a could have a credit card that is issued by card holder bank 108a.

FIG. 1 also shows a cloud-based computing resource 102 including a computing device 116 (e.g., a server, database, computer, etc.) that is configured to store, at a cloud-based memory device 104 of the cloud-based computing resource 102, one or multiple web-based applications 114 that can be customized. A non-limiting example of an application is a software program that is designed to perform a specific function for the user, or in some cases for another application program. The cloud-based memory device 104 can be any form of data storage device including, but not limited to, electronic, magnetic, optical recording mechanisms, combinations thereof or any other form of memory device capable of storing data.

Figure 5:
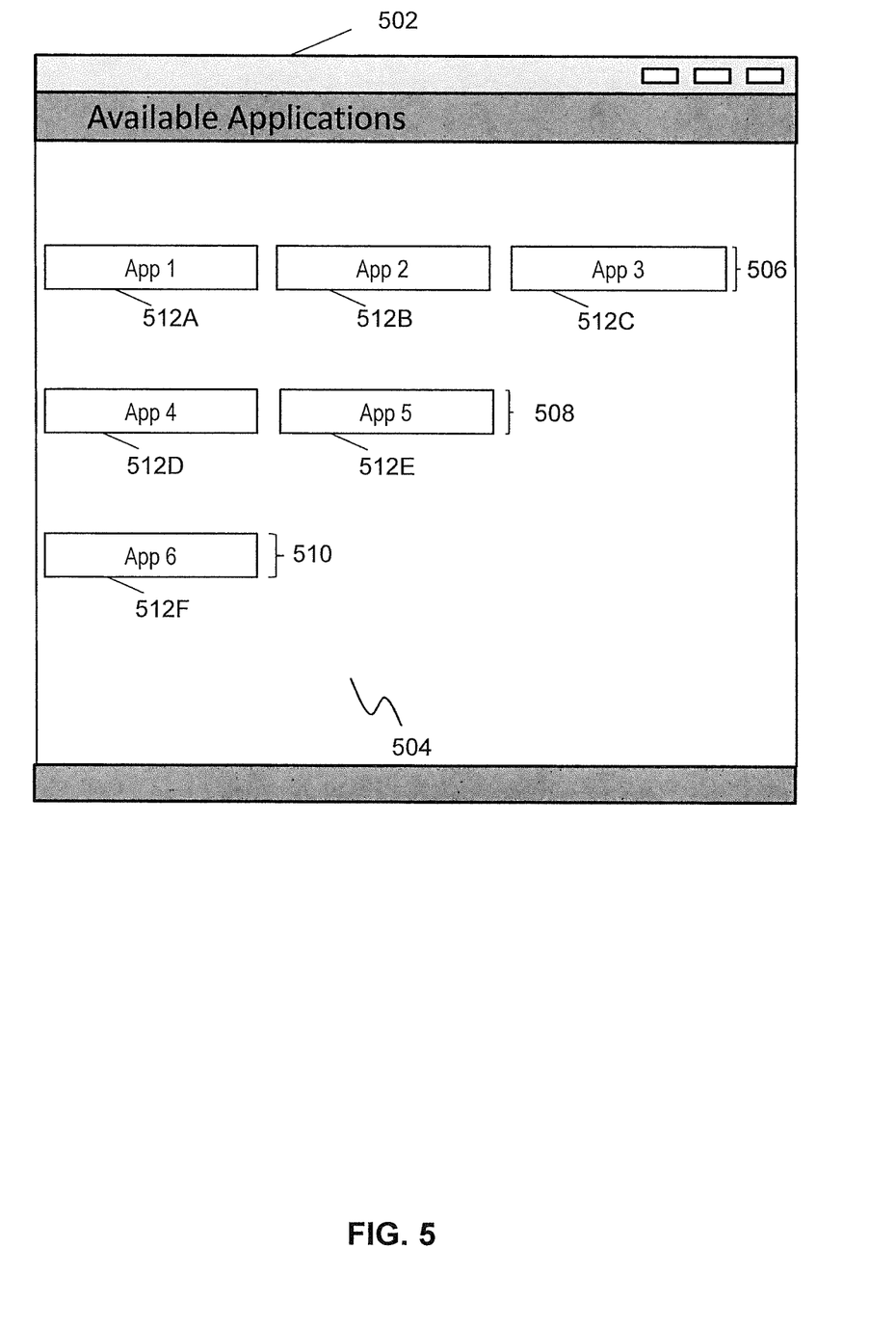
FIG. 5 is a graphical representation of a display screen of a computing device in accordance with an exemplary embodiment.

The cloud-based computing resource 102 can also be configured to allow the computing device 110 of the user 112, after the user 112 has gained access to the online website of the financial institution 108 and selected a link (e.g., hyperlink on a webpage or other electronic link) to an application offering page, to access the application offering page identifying at least two web-based applications 114 that are stored on the cloud-based computing resource 102. An exemplary embodiment of the application offering page is shown in FIG. 5 and will be discussed in further detail below.

The cloud-based computing resource 102 can also be configured to receive a selection of an application 114 from among the applications 114 of the application offering page made by the user 112 via the interface device of the computing device 110. The cloud-based computing resource 102 can also transmit, to the computing device 110, data that allows the selected application 114 to be displayed on the display screen of the computing device 110, the selected application 114 being stored on the cloud-based memory device 104 of the cloud-based computing resource 102.

The cloud-based computing resource 102 can also be configured to transmit, to the computing device 110, data that allows data pertaining to the user 112 (e.g., personal identification information, address, account number, phone number, etc.) that was previously stored by the financial institution 108 to be displayed on a display screen of the computing device 110.

The applications 114 that are stored on the cloud-based computing resource 102 can be provided to multiple financial institutions 108 (e.g., banks) by the host of the cloud-based computing resource 102 (e.g., a payment network). In an exemplary embodiment, at least one web-based application 114 stored on the cloud-based computing resource 102 can be customized based on specifications provided by the financial institution 108 of the user 112.

In an exemplary embodiment, the cloud-based computing resource 102 can be hosted by a payment network. It is also possible for a financial institution 108 to select a set of applications to which a user 112 can have access to on the cloud-based computing resource 102.

In one embodiment, a web-based management screen of the selected application 114 can be displayed on the display screen of the computing device 110, to the user 112, and the web-based management screen can be pre-populated with data pertaining to the user 112 (e.g., account numbers, personal identification information, address, account number, phone number, account balances, etc.) that was previously stored by the financial institution 108 of the user 112.

When the applications 114 are displayed to the user, a plurality of applications 114 in the application offering page can be clustered according to subject matter of the applications 114. It is also possible that the applications 114 can be clustered in different ways, or are not clustered at all. For example, the applications 114 can be arranged in alphabetical order, release date, relative popularity, order of predicted interest of the user based on user account profile information, etc.

It is possible for the cloud-based computing resource 102 to store various types of applications 114. Some of the applications can expand the user's control and functionality over their payment card with the card issuer or card holder bank 108. One possible application 114 stored in the cloud-based memory device 104 of the cloud-based computing resource 102 can be a financial transaction card management application, in which an acceptance area and control limits of the payment card of the user 112 can be modified. For example, the application 114 can allow the user 112 to easily increase or decrease the acceptance area and/or set dollar amount limits on transactions that should be approved, etc.

For instance, an exemplary mobile device application 114 would enable users 112 to perform one or more of the following:
- register one or multiple mobile devices into a card management computer system;
- associate (i.e., link) one or more mobile devices to one or multiple payment cards;
- locate ATMs, bank branches, merchants accepting particular financial payment cards, etc.;
- perform spending analytics and budgeting, alerts, etc.;
- access social media sites/services, websites, etc.; and
- set location based controls on the payment cards.

The above functions are intended to be non-limiting examples.

An exemplary application 114 can further enable users 112 (and/or banks and/or card issuers 108) to perform one or more of the following:
- define personal or custom location areas or other location based criteria, such as, but not limited to: home location (city and country), usual destinations (cities, countries, etc.), etc.;
- define personal or custom control profiles, such as, but not limited to: "at home," "at school," "traveling," etc., which include custom controls designed by the cardholder related to the geographic location information identified by the profile name; and
- associate different "personal locations" to "personal control profiles" such that when the mobile device reports a current location identified in a "personal locations" data file, the associated "personal control profiles" can be automatically invoked.

These function are presented as some additional non-limiting examples. As described above, the financial institution (banks, card issuers 108, etc.) can customize and tailor the applications to fit their specific needs, e.g., include their logo on the application, contain certain functionality specific to their business products, etc.

An exemplary financial transaction card related application 114 can contain card location-based controls that can, in certain embodiments, include the ability for consumers 112 (and/or banks or card issuers 108) to set one or more of the following:
- authorization locks (enable/disable card transactions based on location);
- authorization limits (maximum spending amount or maximum number of transactions based on location); and
- transaction alerts (e.g., sent over TCP/IP networks, SMS, email, software alerts, etc.) based on location.

Another possible application 114 stored in the cloud-based memory device 104 of the cloud-based computing resource 102 can be a web-based application that provides for modification of fraud control settings associated with geo-location. A financial card related application can also be stored in the cloud-based memory device 104 of the cloud-based computing resource 102. An additional possible application 114 stored in the cloud-based memory device 104 of the cloud-based computing resource 102 can be a web-based application that pertains to person-to-person payment transactions. It is also possible that the cloud-based memory device 104 of the cloud-based computing resource 102 can store an application that provides reviews of restaurants, hotels, books, etc. An additional possible application stored in the cloud-based memory device 104 of the cloud-based computing resource 102 can be a web-based application that allows insurance to be purchased and/or activated.

Another web-based application 114 that can be stored in the cloud-based memory device 104 of the cloud-based computing resource 102 can be an application that pertains to a digital wallet that can enable a seamless, secure and speedy check out regardless of where consumers may be and what screen they may be using. A digital wallet securely stores credit card information and shipping information in a secure cloud hosted by a trusted entity (e.g., the cloud-based computing resource 102) and also provides added tools that provide consumers with real-time alerts, account balances, loyalty programs, etc. The application 114 that pertains to a digital wallet can allow a user to easily enroll with the wallet service and manage their wallet account. It is also possible for the cloud-based memory device 104 of the cloud-based computing resource 102 to store an application 114 in which bill payments can be easily managed.

In an exemplary embodiment, applications 114 (some or all) stored in the cloud-based computing resource 102 are created by the financial institution 108 of the user 112 or a third party. Further, in an exemplary embodiment, applications 114 that are created by the financial institution 108a of the user 112a or the third party can be accredited by the host of the cloud-based computing resource 102 (e.g., accredited by a payment network).

Card Issuer/Card Holder Bank System Architecture

Figure 2:
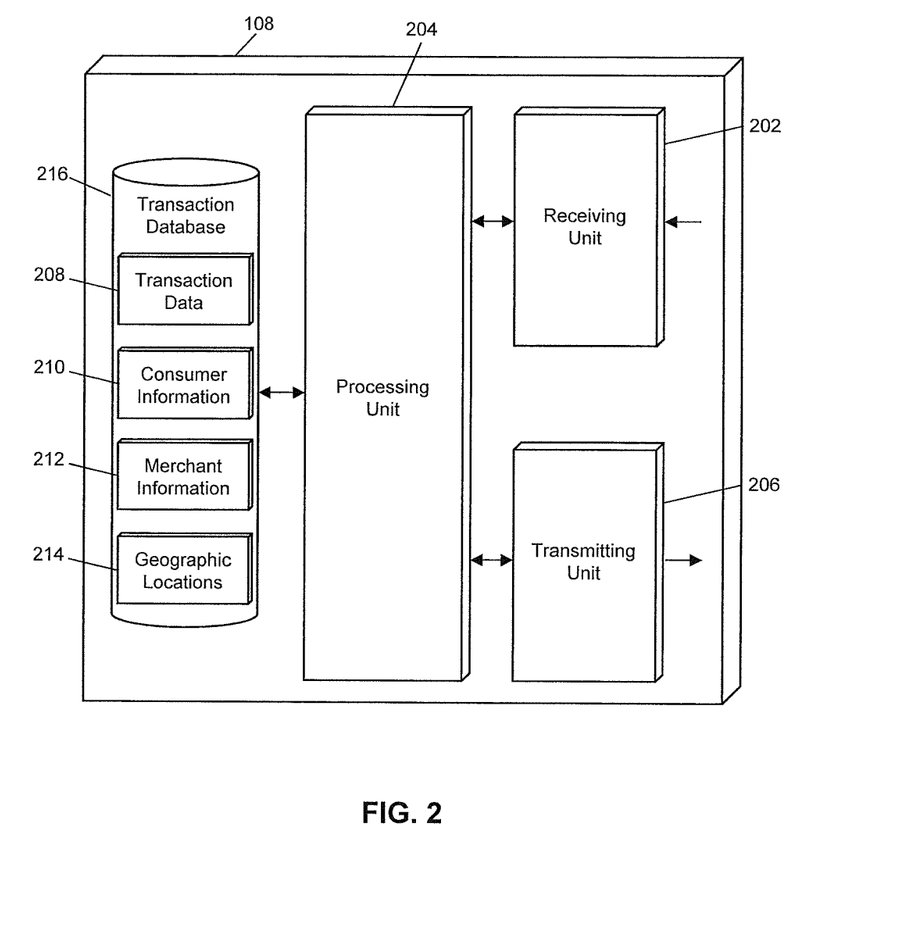
FIG. 2 illustrates a block diagram illustrating a hardware architecture of a card holder/card holder bank in accordance with an exemplary embodiment.

FIG. 2 illustrates an exemplary embodiment of the system architecture 108 of the card issuer/card holder bank 108. The system architecture can be operated by another entity on behalf of the card issuer/card holder bank 108 or operated by the card issuer/card holder bank 108. The system is not limited to these particular examples as the system architecture can be located in various places or operated by many different entities. It will be apparent to persons having skill in the relevant art that the embodiment of the system architecture of the card issuer/card holder bank 108 illustrated in FIG. 2 is provided as illustration only and may not be exhaustive to all possible configurations of the system architecture of the card issuer/card holder bank 108 suitable for performing the functions as discussed herein.

The system architecture of the card issuer/card holder bank 108 can include a receiving unit 202. The receiving unit 202 can be configured to interface (e.g., connect, communicate, etc.) with one or more networks in order to receive data, information, etc. The receiving unit 202 can receive the authorization request from a merchant acquirer, and can also receive data for including in the transaction data entries of a transaction database 216, such as transaction data 208 (e.g., from a payment network), consumer information 210 (e.g., from a demographic tracking agency), merchant information 212, and geographic locations 214.

The system architecture of the card issuer/card holder bank 108 may also include a processing unit 204. The processing unit 204 may be configured to identify and/or analyze the data received via the receiving unit 202, such as data related to payment transactions, and perform additional functions as discussed herein as will be apparent to persons having skill in the relevant art.

The system architecture 108 of the card issuer/card holder bank 108 may also include a transmitting unit 206. The transmitting unit 206 may be configured to transmit the generated data file to a requesting entity via one or more communication networks operating using one or more network protocols.

Application Providing Methods

Figure 3:
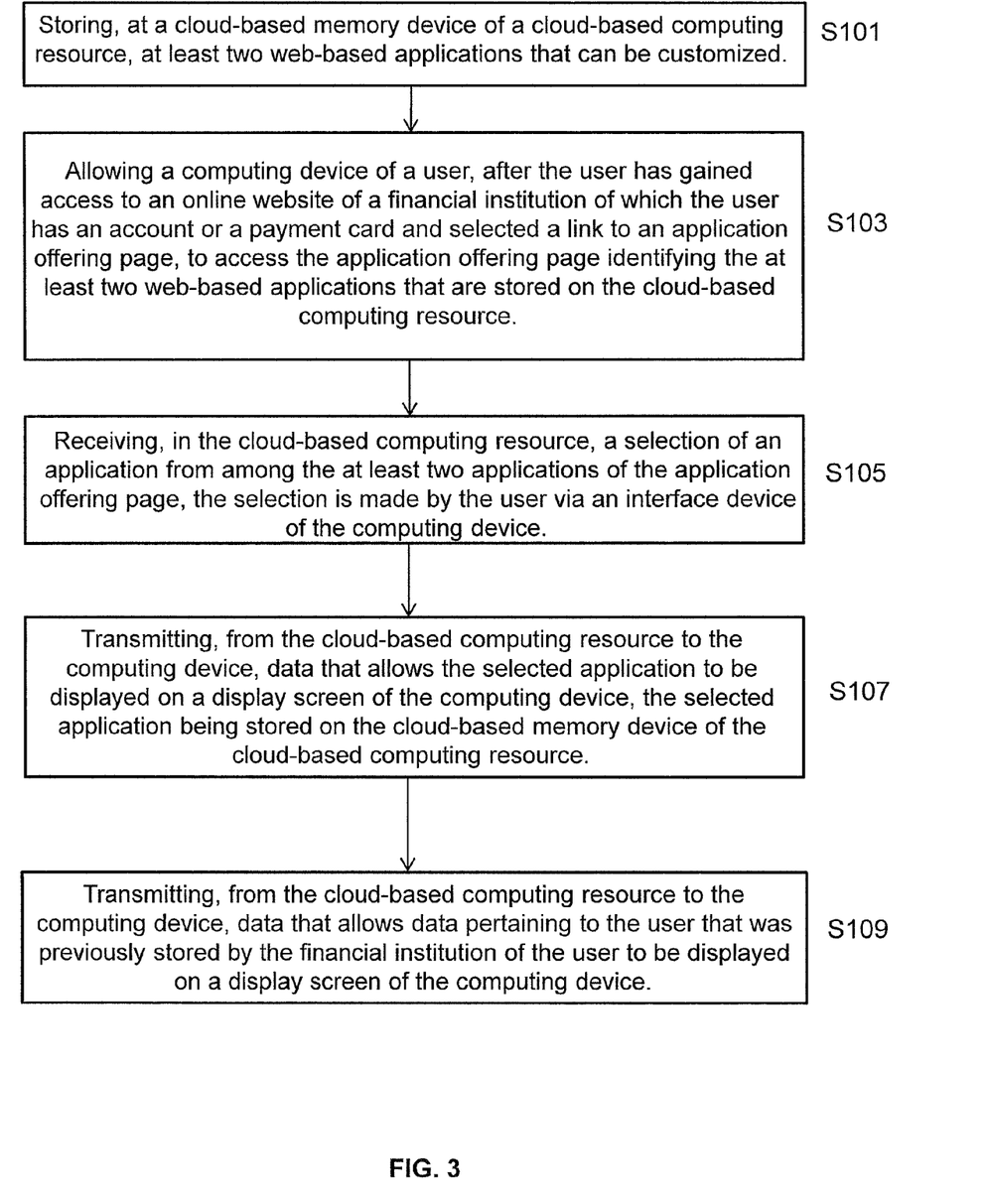
FIG. 3 is a flow chart illustrating an exemplary method of an embodiment.

FIG. 3 shows an exemplary application providing method. FIG. 3 shows, in step S101, storing, at a cloud-based memory device 104 of a cloud-based computing resource 102, at least two web-based applications 114 that are customized. These applications 114 might be presented in several versions and may be customized as to functionality, trademarks, look-and-feel, or other ways to distinguish a brand's version over another version (e.g., financial institutions offering access to the applications). For example, in regard to customizing the look and feel of the application, the financial institution's logo can be displayed in the background of a screen, the financial institution's logo can be displayed during a welcome or initial screen, a banner at the top of a screen can contain colors associated with the financial institution, etc.

Step S103 shows a step of allowing a computing device 110 of a user 112 after the user 112 has gained access to an online website of a financial institution 108 of which the user has an account or a payment card and selected a link to an application offering page, to access the application offering page identifying the at least two web-based applications 114 that are stored on the cloud-based computing resource 102. For example, a bank, credit union, or other financial institution can provide applications 114 to their cardholders. The bank, credit union, etc. is able to select customized applications 114 that are stored on the cloud, offer them to their cardholders via a website of the bank, credit union, etc. It is possible that the customized applications allow for data pertaining to the customer to be prepopulated into data fields of the application. It is also possible that that the application offering page is made available only to customers who pay for a subscription service, or it can be available to new customers for a limited time, or available to all customers.

Step S105 shows a step of receiving, in the cloud-based computing resource 102, a selection of an application 114 from among the at least two applications 114 of the application offering page, the selection is made by the user 112 via an interface device of the computing device 110.

Step S107 shows a step of transmitting, from the cloud-based computing resource 102 to the computing device 110, data that allows the selected application 114 to be displayed, on a display screen of the computing device 110, the selected application 114 being stored on the cloud-based memory device 104 of the cloud-based computing resource 102. Alternatively, or in a mixed offering, some components of the application 114 can be downloaded and reside on the computing device 110, but other functions, computing, and/or displays can reside in the cloud-based computing resource 102.

The last step of the method of FIG. 3, step S109, is transmitting, from the cloud-based computing resource 102 to the computing device 110, data that allows data pertaining to the user 112 that was previously stored by the financial institution 108 of the user 112 to be displayed on a display screen of the computing device 110.

Figure 7:
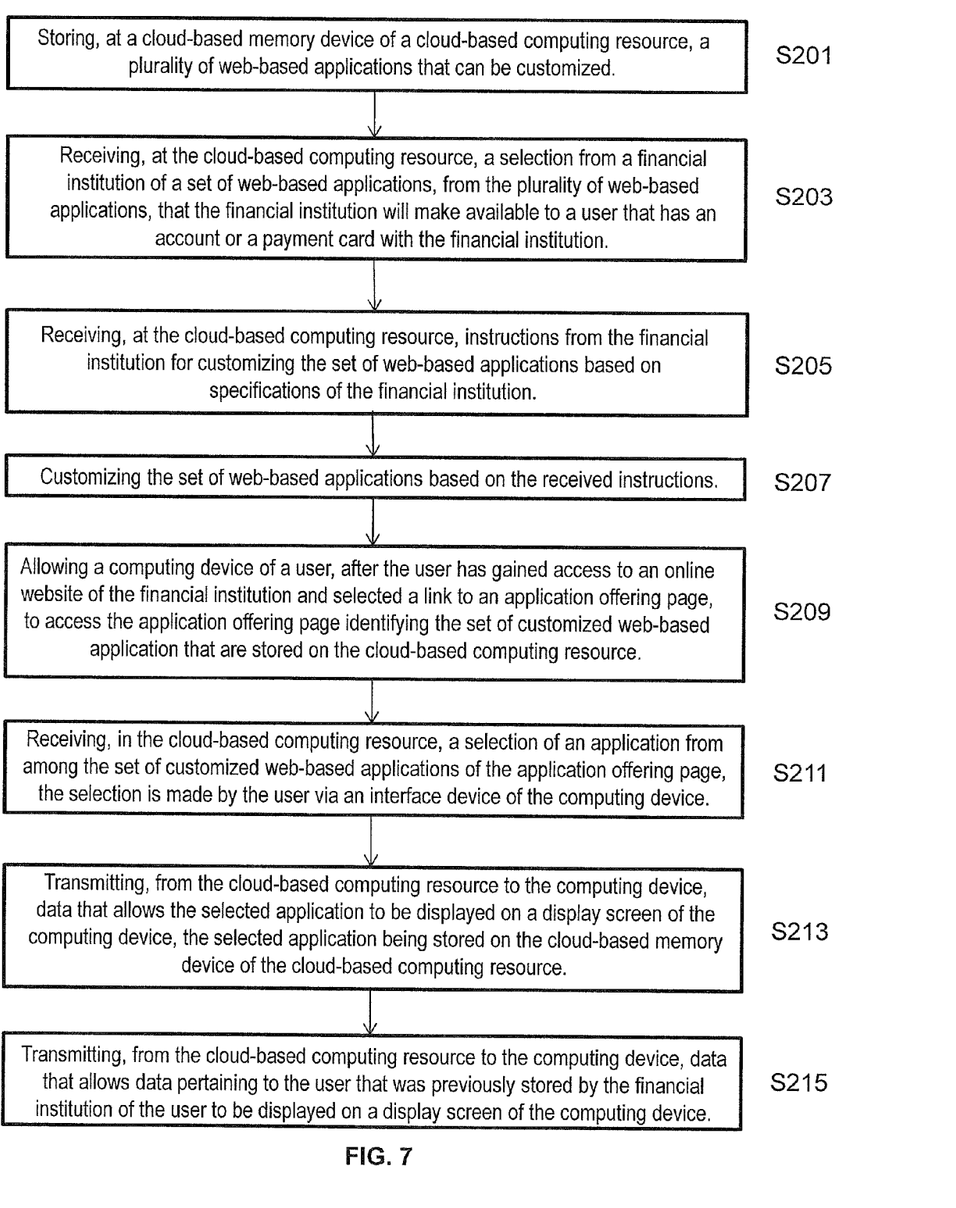
FIG. 7 is flow chart illustrating an exemplary method of an alternative embodiment.

FIG. 7 shows another exemplary application providing method, which will now be explained. Step S201 includes storing, at a cloud-based memory device 104 of a cloud-based computing resource 102, a plurality of web-based applications 114 that can be customized.

Step S203 includes receiving, at the cloud-based computing resource 102, a selection from a financial institution 108 of a set of web-based applications, from the plurality of web-based applications 114, that the financial institution 108 will make available to a user 112 that has an account or a payment card with the financial institution 108.

Step S205 includes receiving, at the cloud-based computing resource 102, instructions from the financial institution 108 for customizing the set of web-based applications based on specifications of the financial institution 108.

Step S207 includes customizing the set of web-based applications 114 based on the received instructions. The web-based applications 114 can be customized by the host of the cloud-based computing resource 102 or a third party.

Step S209 includes allowing a computing device 110 of a user 112, after the user 112 has gained access to an online website of the financial institution 108 and selected a link to an application offering page, to access the application offering page identifying the set of customized web-based applications 114 that are stored on the cloud-based computing resource 102.

Step S211 includes receiving, in the cloud-based computing resource 102, a selection of an application 114 from among the set of customized web-based applications 114 of the application offering page, the selection is made by the user 112 via an interface device of the computing device 110.

Step S213 of the method includes transmitting, from the cloud-based computing resource 102 to the computing device 110, data that allows the selected application 114 to be displayed on a display screen 630 (shown in FIG. 6) of the computing device 110, the selected application being stored on the cloud-based memory device 104 of the cloud-based computing resource 102.

Step S215 of the method includes transmitting, from the cloud-based computing resource 102 to the computing device 110, data that allows data pertaining to the user 112 that was previously stored by the financial institution 108 of the user 112 to be displayed on a display screen 630 of the computing device 110.

Data Flow

Figure 4:
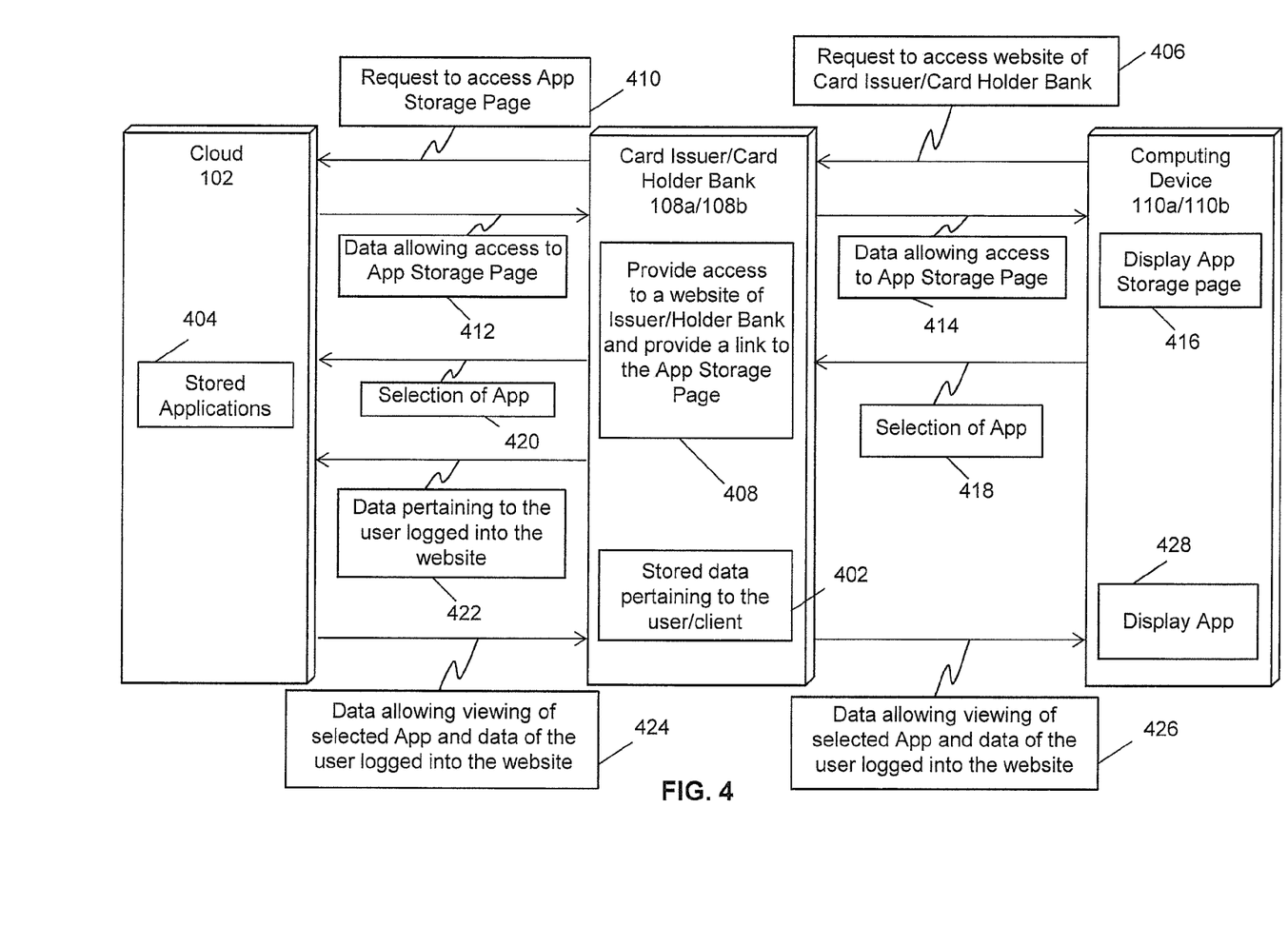
FIG. 4 illustrates a high level diagram of a system architecture that may be employed in accordance with an exemplary embodiment of providing financial transaction card related mobile applications.

FIG. 4 illustrates the data flow between the cloud-based computing resource 102, the card issuer/card holder bank 108, and the computing device 110. FIG. 4 shows that the card issuer/card holder bank 108 may store, at 402, data (e.g., address information, account information, name, phone number, etc.) pertaining to the user/client 112 of the card issuer or card holder bank 108. FIG. 4 also shows that the cloud-based computing resource 102 contains stored applications at 404. A request 406 to access the website of the card issuer/card holder bank 108 is sent from the computing device 110 to the card issuer/card holder bank 108. Next, at 408, the card issuer/card holder bank 108 can provide access to their website and provide a link to the application offering page. The link can then be selected by the user 112 of the computing device 110. Next, a request 410 to access the application offering page is sent from the card issuer/card holder bank 108 to the cloud-based computing resource 102. Data 412 allowing access to the application offering page can be sent from the cloud-based computing resource 102 to the card issuer/card holder bank 108.

Data 414 allowing access to the application offering page can be sent from the card issuer/card holder bank 108 to the computing device 110. At 416, the application offering page is displayed on the computing device 110. Data 418, indicative of the user's 112 selection of a particular application 114, can be sent from the computing device 110 to the card issuer/card holder bank 108.

Data 420 that indicates the selection of the particular application is sent form the card issuer/card holder bank 108 to the cloud-based computing resource 102. Next, data 422 that can include information pertaining to the user 112 that is currently logged into the website (that has been previously stored in card issuer/card holder bank 108) can be transmitted from the card issuer/card holder bank 108 to the cloud-based computing resource 102. Next, data 424 can be sent from the cloud-based computing resource 102 to the card issuer/card holder bank 108. Data 424 can include data that allows viewing of the application that was selected by the user 112 and viewing of data about the user 112 that is logged into the website.

Data 426 can then be sent from the card issuer/card holder bank 108 to the computing device 110. The data 426 can allow for viewing of the application 114 that was selected by the user 112 and viewing of data about the user 112 that is logged into the website. Lastly, at 428, the selected application 114 can be displayed by the computing device 110. The stored data 402 pertaining to the user 112 can be used by the selected application 114 and/or displayed to the user 112. In other words, the stored data 402 can be used by the application 114 to enhance the functionality of the application 114 or customize the application 114 for the user 112. It also can allow for certain display fields to be auto-populated by the stored data 402. It is possible that the various data flows of FIG. 4 can be performed in a different order than described above. In addition, it is possible that certain data/data requests can be sent directly between the cloud-based computing resource 102 and computing device 110 rather than through the card issuer/card holder bank 108 as an intermediary.

Application Offering Page

FIG. 5 is a representation of an application offering page 502 of a display screen that can be outputted by the computing device 110. Application offering page 502 can include an application display area 504 that displays a plurality of applications 512, such as applications 512A, 512B, 512C, 512D, 512E, and 512F illustrated in FIG. 5. FIG. 5 shows that the applications 512 are arranged in a plurality of rows. In particular, FIG. 5 shows a first row 506 that is comprised of applications 512A, 512B, and 512C. A second row 508 is comprised of applications 512D and 512E, and a third row 510 is comprised of application 512F. The applications 512 in the various rows can be grouped according to the subject matter of the applications. For example, the three applications 512 in row 506 can be of similar subject matter, and the two applications 512 in row 508 can be of similar subject matter. The applications 512 can be displayed on the application offering page 502 in many other arrangements. Each can be hyperlinked or otherwise associated with descriptions, feedback pages, external links, etc.

Computer System Architecture

Figure 6:
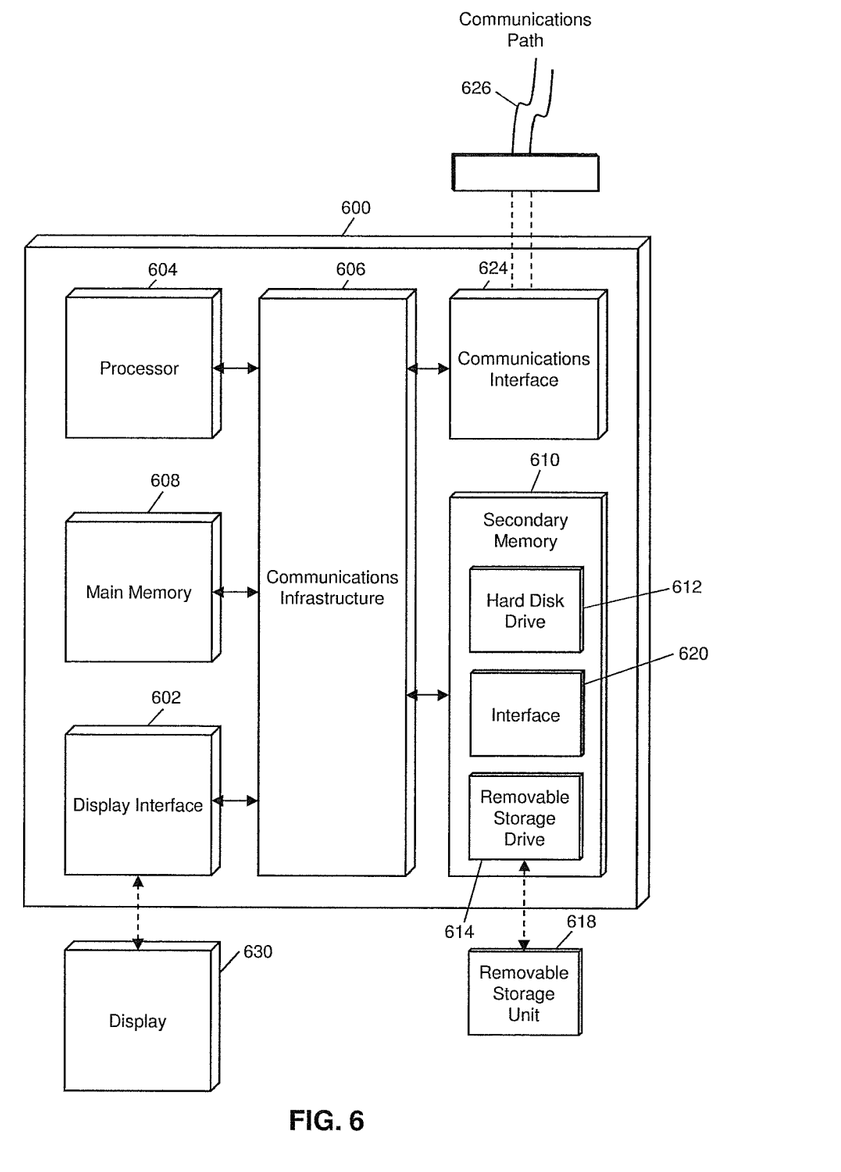
FIG. 6 is a block diagram illustrating a computer system architecture in accordance with an exemplary embodiment.

FIG. 6 illustrates a computer system 600 in which embodiments of the present disclosure, or portions thereof, can be implemented as computer-readable code. For example, the computing device 110, the cloud-based computing resource 102, and the card issuer/card holder bank 108 of FIG. 1 can be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4 and 7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, and a hard disk installed in hard disk drive 612.

Various embodiments of the present disclosure are described in terms of this exemplary computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor 604 may be a special purpose or a general purpose processor device. The processor device 604 may be connected to a communication infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive, the removable storage unit 618 may be a floppy disk. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 618 and an interface 620. Examples of such means may include a program cartridge and cartridge interface (e.g., as found in video game systems), a removable memory chip (e.g., EEPROM, PROM, etc.) and associated socket, and other removable storage units 618 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIG. 3, 4, or 7, or a similar method, as discussed herein. Accordingly, such computer programs may represent controllers of the computer system 600. Where the present disclosure is implemented using software, the software may be stored in a computer program product or computer readable medium and loaded into the computer system 600 using the removable storage drive 614, interface 620, and hard disk drive 612, or communications interface 624. Lastly, the computer system 600 may also include a display interface 602 that outputs display signals to a display unit 630, e.g., LCD screen, plasma screen, LED screen, DLP screen, CRT screen, etc.

While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

As can be seen above, the application providing method and system can be implemented in any number of ways as discussed above, or as will become apparent to those skilled in the art after reading this disclosure. These embodiments, as well as variations and modifications thereof, which will occur to those skilled in the art, are encompassed by the application providing method and system. Hence, the scope of the application providing method and system is limited only by the metes and bounds as articulated in the claims appended hereto.

What is claimed is:

1. A computer-implemented application providing method comprising:

storing, at a cloud-based memory device of a cloud-based computing resource, at least two web-based applications associated with a financial institution that can be customized, wherein said cloud-based computing resource electronically communicates with a processor of a financial institution;

(i) after a user has been granted access, via a computer device of the user, to an online website of the financial institution of which the user has an account or a payment card and (ii) and after the user has selected a link, via the online website of the financial institution, to an application offering page, enabling, by the cloud-based computing resource, the computing device of the user, which is in electronic communication with the financial institution, to access the application offering page, wherein said application offering page identifies the at least two web-based applications that are associated with the financial institution that are stored on the cloud-based computing resource;

receiving, in the cloud-based computing resource, from the financial institution, (1) a user-selection of an application from among the at least two applications associated with the financial institution of the application offering page, and (2) user data that is stored at the financial institution, wherein the user-selection is originally made by the user via an interface device of the computing device in communication with the financial institution; and transmitting, from the cloud-based computing resource to the computing device, via the financial institution, data that allows the user-selected application associated with the financial institution to be displayed on a display screen of the computing device, wherein the user-selected application is not required to be downloaded or stored on the computing device of the user and is pre-populated with appropriate user data that was received, by the cloud-based computing resource from the financial institution.

2. The application providing method of claim 1, wherein at least one of the at least two applications is provided to multiple financial institutions by the host of the cloud-based computing resource.

3. The application providing method of claim 1, further comprising:

customizing at least one web-based application stored on the cloud-based computing resource based on specifications of the financial institution of the user.

4. The application providing method of claim 1, wherein the cloud-based computing resource is hosted by a payment network.

5. The application providing method of claim 1, further comprising receiving a selection by a financial institution of a set of applications the user will have access to on the cloud-based computing resource via said financial institution.

6. The application providing method of claim 1, wherein the financial institution is a financial card issuer or a financial card holder bank.

7. The application providing method of claim 1, further comprising:

causing display of, on a display screen of the computing device, a web-based management screen of the selected application to the user.

8. The application providing method of claim 1, wherein a plurality of applications in the application offering page are clustered according to subject matter of the applications.

9. The application providing method of claim 1, wherein an application stored in the cloud-based memory device of the cloud-based computing resource is a financial transaction card management application in which an acceptance area and control limits can be modified.

10. The application providing method of claim 9, wherein applications that are created by the financial institution of the user or the third party are accredited by the host of the cloud-based computing resource.

11. The application providing method of claim 1, wherein an application of the at least one web-based application provides additional functionality to the user's account or payment card.

12. The application providing method of claim 1, wherein an application of the at least one web-based application provides for modification of fraud control settings associated with geo-location.

13. The application providing method of claim 1, wherein an application of the at least one web-based application is a financial card related application.

14. The application providing method of claim 1, wherein an application of the at least one web-based application pertains to person-to-person payment transactions.

15. The application providing method of claim 1, wherein an application of the at least one web-based application provides reviews of restaurants, hotels, or books.

16. A computer-implemented application providing system, comprising:
  a computing device of a user that includes a processor, an interface device, and a display screen;
  a financial institution that has an online website of which the user has an account or a payment card, wherein said financial institution is in electronic communication with the computing device of the user; and
  a cloud-based computing resource in electronic communication with said financial institution and configured to:
    store at a cloud-based memory device of the cloud-based computing resource at least two web-based applications associated with said financial institution that can be customized;
    (i) after a user has been granted access, via a computer device of the user, to an online website of the financial institution of which the user has an account or a payment card and (ii) after the user has selected a link, via the online website of the financial institution, to an application offering page, allow the computing device of the user, which is in electronic communication with the financial institution, to access the application offering page, wherein said application offering page identifies the at least two web-based applications that are associated with the financial institution that are stored on the cloud-based computing resource;
    receive, from the financial institution, (1) a user-selection of an application from among the at least two applications associated with the financial institution of the application offering page, and (2) user data that is stored at the financial institution, wherein the user-selection is originally made by the user via the interface device of the computing device in communication with the financial institution; and
    transmit, to the computing device, via the financial institution, data that allows the user-selected application associated with the financial institution to be displayed on the display screen of the computing device, wherein the user-selected application is not required to be downloaded or stored on the computing device of the user and is pre-populated with appropriate user data that was received, by the cloud-based computing resource from the financial institution.

17. The application providing system of claim 16, wherein at least one of the at least two applications is provided to multiple financial institutions by the host of the cloud-based computing resource.

18. The application providing system of claim 16, wherein at least one web-based application stored on the cloud-based computing resource is customized based on specifications of the financial institution of the user.

19. The application providing system of claim 16, wherein the cloud-based computing resource is hosted by a payment network.

20. The application providing system of claim 16, wherein the financial institution selects a set of applications the user will have access to on the cloud-based computing resource.

21. The application providing system of claim 16, wherein the financial institution is a financial card issuer or a financial card holder bank.

22. The application providing system of claim 16, wherein a web-based management screen of the selected application is displayed, on the display screen of the computing device, to the user.

23. The application providing system of claim 16, wherein a plurality of applications in the application offering page are clustered according to subject matter of the applications.

24. The application providing system of claim 16, wherein an application stored in the cloud-based memory device of the cloud-based computing resource is a financial transaction card management application in which an acceptance area and control limits can be modified.

25. The application providing system of claim 16, wherein applications stored in the cloud-based computing resource are created by the financial institution of the user or a third party.

26. The application providing system of claim 25, wherein applications that are created by the financial institution of the user or the third party are accredited by the host of the cloud-based computing resource.

27. The application providing system of claim 16, wherein an application of the at least one web-based application provides additional functionality to the user's account or payment card.

28. The application providing system of claim 16, wherein an application of the at least one web-based application provides for modification of fraud control settings associated with geo-location.

29. The application providing system of claim 16, wherein an application of the at least one web-based application is a financial card related application.

30. The application providing system of claim 16, wherein an application of the at least one web-based application pertains to person-to-person payment transactions.

31. The application providing system of claim 16, wherein an application of the at least one web-based application provides reviews of restaurants, hotels, or books.

32. A computer-implemented application providing method comprising:
- storing, at a cloud-based memory device of a cloud-based computing resource, a plurality of web-based applications that can be customized, wherein said cloud-based computing resource electronically communicates with a processor of a financial institution;
- receiving, at the cloud-based computing resource, a selection from the financial institution of a set of web-based applications, from the plurality of web-based applications, that the financial institution will make available to a user that has an account or a payment card with the financial institution;
- receiving, at the cloud-based computing resource, instructions from the financial institution for customizing the set of web-based applications based on specifications of the financial institution;
- customizing the set of web-based applications based on the received instructions;
- (i) after the user has been granted access, via a computer device of the user, to an online website of the financial institution and (ii) after the user selects a link, via the online website of the financial institution, to an application offering page, enabling, by the cloud-based computer resource, the computing device of the user to access the application offering page, which identifies the set of customized web-based applications of the financial institution that are stored on the cloud-based computing resource;
- receiving, in the cloud-based computing resource, from the financial institution, (1) a user-selection of an application from among the set of customized web-based applications of the financial institution of the application offering page, and (2) user data that is stored at the financial institution, wherein the user-selection is originally made by the user via an interface device of the computing device in communication with the financial institution;
- transmitting, from the cloud-based computing resource to the computing device, via the financial institution, data that allows the user-selected customized application of the financial institution to be displayed on a display screen of the computing device, wherein the user-selected application is not required to be downloaded or stored on the computing device of the user and is pre-populated with appropriate user data that was received, by the cloud-based computing resource from the financial institution.

\* \* \* \* \*